United States Patent
Bilbrey

(10) Patent No.: US 8,253,852 B2
(45) Date of Patent: *Aug. 28, 2012

(54) EMBEDDED CAMERA WITH PRIVACY FILTER

(75) Inventor: Brett Bilbrey, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/716,454

(22) Filed: Mar. 3, 2010

(65) Prior Publication Data

US 2010/0165169 A1 Jul. 1, 2010

Related U.S. Application Data

(63) Continuation of application No. 11/325,268, filed on Jan. 4, 2006, now Pat. No. 7,728,906.

(51) Int. Cl.
*H04N 5/225* (2006.01)

(52) U.S. Cl. ............... 348/373; 348/224.1; 348/361

(58) Field of Classification Search .......... 348/208.11, 348/224.1, 351, 361–373
See application file for complete search history.

(56) References Cited

U.S. PATENT DOCUMENTS

| | | | |
|---|---|---|---|
| 4,301,476 A | 11/1981 | Keller et al. | |
| 4,566,029 A * | 1/1986 | Johnson | 348/265 |
| 5,649,897 A * | 7/1997 | Nakamura et al. | 600/111 |
| 5,678,089 A * | 10/1997 | Bacs et al. | 396/324 |
| 5,764,291 A | 6/1998 | Fullam | |
| 5,883,695 A | 3/1999 | Paul | |
| 5,944,655 A | 8/1999 | Becker | |
| 5,995,145 A | 11/1999 | Viliesid | |
| 6,094,215 A | 7/2000 | Sundahl et al. | |
| 6,151,164 A * | 11/2000 | Greening et al. | 359/466 |
| 6,256,066 B1 | 7/2001 | Yukawa et al. | |
| 6,281,927 B1 | 8/2001 | Otto et al. | |
| 6,285,834 B1 * | 9/2001 | Hylen | 396/544 |
| 6,546,208 B1 | 4/2003 | Costales | |
| 6,624,935 B2 | 9/2003 | Weissman et al. | |
| 6,683,298 B1 | 1/2004 | Hunter et al. | |
| 7,136,282 B1 * | 11/2006 | Rebeske | 361/679.55 |
| 7,170,677 B1 | 1/2007 | Bendall et al. | |
| 7,513,701 B2 | 4/2009 | Naganuma | |

(Continued)

FOREIGN PATENT DOCUMENTS

JP 2000214517 A 8/2000

(Continued)

OTHER PUBLICATIONS

Office Action issued in Japanese Patent Application No. 2006-353032 on Mar. 13, 2009, 2 pages.

(Continued)

*Primary Examiner* — Tuan Ho
*Assistant Examiner* — Kent Wang
(74) *Attorney, Agent, or Firm* — Fish & Richardson P.C.

(57) ABSTRACT

An apparatus includes a housing having an integrated camera. A panel is positioned in front of at least a portion of the camera and is operable to selectively switch between at least a substantially transparent state and at least a substantially opaque state.

28 Claims, 2 Drawing Sheets

U.S. PATENT DOCUMENTS

| | | | |
|---|---|---|---|
| 7,728,906 B2* | 6/2010 | Bilbrey | 348/373 |
| 7,826,234 B2* | 11/2010 | Lee et al. | 361/809 |
| 2001/0014006 A1* | 8/2001 | Kim et al. | 361/683 |
| 2003/0125008 A1* | 7/2003 | Shimamura | 455/344 |
| 2005/0174470 A1* | 8/2005 | Yamasaki | 348/345 |
| 2005/0259179 A1 | 11/2005 | Robertson et al. | |
| 2005/0275751 A1 | 12/2005 | VanEpps, Jr. | |
| 2005/0285963 A1* | 12/2005 | Misawa et al. | 348/333.06 |
| 2007/0046680 A1* | 3/2007 | Hedrick et al. | 345/503 |
| 2008/0013001 A1* | 1/2008 | Jang et al. | 349/15 |

FOREIGN PATENT DOCUMENTS

| | | |
|---|---|---|
| JP | 2001298654 A | 10/2001 |
| JP | 2004040201 A | 2/2004 |

OTHER PUBLICATIONS

Office Action issued in Japanese Patent Application No. 2006-353032 on Aug. 31, 2009 (translation unavailable), 2 pages.

* cited by examiner

EMBEDDED CAMERA WITH PRIVACY FILTER

CROSS-REFERENCE TO RELATED APPLICATION

This application is a continuation application of and claims priority to U.S. application Ser. No. 11/325,268, filed on Jan. 4, 2006, the entire disclosure of which is incorporated herein by reference.

TECHNICAL FIELD

This invention relates to electronic devices and, more particularly, to an embedded camera with privacy filter.

BACKGROUND

Image sensors can be used to detect video sequences that can be used by various client processes in a laptop or desktop computer environment. For example, detected video sequences can be used for webcam applications, videophone operations, or video editing. In a typical webcam or videophone operation, images detected by an image sensor are transmitted over the Internet to one or more remote computers on which the images can be viewed. By detecting and transmitting images at a sufficient rate, a user at a remote computer can view a video sequence in substantially real-time.

Conventional cameras for use with computers are external peripherals, although built-in cameras can also be used. Such cameras can use charge-coupled device (CCD) sensors or complementary metal-oxide semiconductor (CMOS) digital image sensors to detect images. CCD sensors are commonly used in digital still and video cameras and provide a relatively high quality image. CMOS sensors generally require less power and are less expensive but provide a lower quality image than CCD sensors, especially at low light levels.

SUMMARY

An apparatus includes a housing having an integrated camera. A panel is positioned in front of at least a portion of the camera and is operable to selectively switch between at least a substantially transparent state and at least a substantially opaque state.

Implementations can include one or more following features. The housing comprises a housing for a computer and/or display device. The panel in the substantially opaque state is perceived as a portion of the housing. The panel in the substantially opaque state and the housing are substantially the same color. The housing comprises a bezel for s screen, and the panel is integrated within the bezel. The housing includes a perceivable boundary, and the panel is substantially coplanar with at least a portion of the perceivable boundary. The housing includes a transparent portion, and the perceivable boundary is adjacent the transparent portion. The panel in the substantially opaque state and the perceivable boundary are substantially the same color. The panel comprises a liquid crystal display (LCD). The housing and the panel are relatively disposed to provide a substantially consistent appearance when the panel is in the substantially opaque state. The substantially consistent appearance is based on a similar depth from a surface of the housing. The panel in the opaque state prevents the camera from capturing images. The panel comprises a non-optical transparent cover, and the apparatus includes a processor for processing images to remove distortion caused by the non-optical transparent cover.

The details of one or more implementations of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
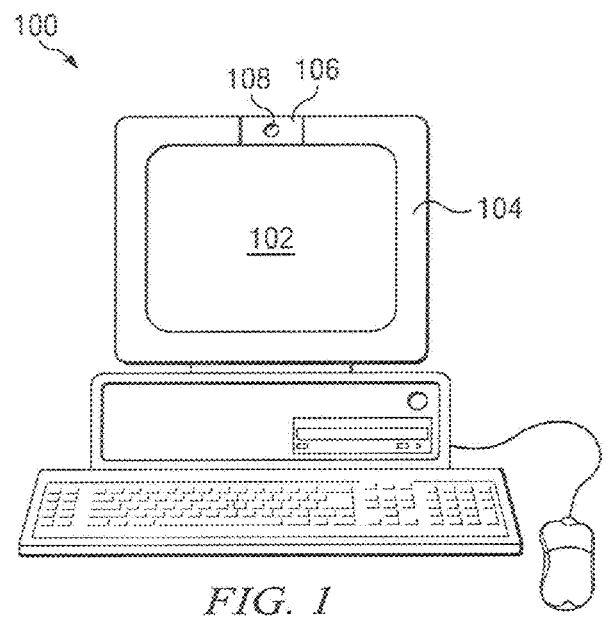
FIG. 1 is an illustrative diagram of a computer that includes a display.

FIG. 1 is an illustrative diagram of a computer system 100 for selectively switching a panel 106 between optical states. For example, the system 100 may provide a window that switches between a substantially transparent state and a substantially opaque state. The substantially transparent state is typically sufficiently transparent to enable a camera embedded in the system 100 and oriented to capture an image through the window. The substantially opaque state is generally sufficiently opaque to prevent the camera from capturing images through the window. Typically, elements associated with a system are affixed to the exterior of the system such as to the frame. For example, a camera for a computer is typically mounted on the top portion of the frame (e.g., above a display screen) for capturing image data. The image data can be used, for example, by a webcam application, a videophone application, video editing software, other image processing software, or an application that stores the image data onto a storage medium for subsequent retrieval and viewing.

Although software that supports processing of image data received from the camera can be used to turn off the camera and/or preclude the capture of image data, users may be uncertain as to the current state of the camera and may feel anxiety over the possibility that image data is being captured unknown to the user or at times when the user desires privacy. To provide a more tangible and evident privacy feature, such cameras may have an opaque shutter or cover that is manually controlled or uses a servo controller to prevent image data from being captured by the camera.

Also, such a physical shutter or cover may be used to cover symbols and/or logos that are typically painted on a portion of the frame to convey information, such as brand or available control functions, to the user or to provide other aesthetic or functional features. The user does not have the option to easily hide, obscure, or otherwise cover such elements. The illustrated system 100 includes a panel 106 that is operable to selectively switch between at least a substantially transparent state and at least a substantially opaque state. As a result, at least a portion of an embedded element 108 may hidden, obscured, or otherwise covered. Indeed, the system 100 may enhance or otherwise improve the aesthetics of the system 100 when the embedded element 108 is not in use by automatically (or in response to a command received through a user interface) switching the panel 106 to an opaque state.

The system 100 may include any processing device operable to present images through a screen 102. As used in this document, the system 100 is intended to encompass a personal computer, a workstation, network computer, kiosk, wireless data port, personal data assistant (PDA) or other portable device, a cellular telephone, a television, one or more processors within these or other devices, or any other suitable processing device. In some cases, the system 100 may present, process, capture, and/or transmit images. For example, the system 100 may include a videoconferencing system that enables a user to communicate with remote parties who wish to approximate face-to-face contact without travel.

In general, the system 100 may include input devices, output devices, mass-storage media, processors, memory, interfaces, communication ports, or other suitable components for communicating with the user. For example, the system 100 may comprise a computer that includes input devices, such as a keypad, touch screen, mouse, camera, or other device that can accept information, and output devices that conveys information associated with the operation of the system 100, including digital data, visual information, or any other suitable information. Both the input devices and output devices may include fixed or removable storage media such as magnetic computer disk, CD-ROM, or other suitable media to both receive input from and provide output to users of the system 100 through a portion of a data display, namely the screen 102, and/or through one or more networks. At a high level, the system 100 includes at least the screen 102, a bezel 104, the panel 106, and the embedded element 108.

The screen 102 may be any suitable device operable to present information in an electronic form. For example, the screen 102 may present dynamic and/or static images such as video, text, photos, and graphical elements. The screen 102 may be a cathode ray tube (CRT) screen, a liquid crystal display (LCD), a plasma display panel (PDP), a field emission display (FED), analog or digital projection, or other displays suitable for creating graphic images and characters recognizable to the user. The screen 102 may be a device that is typically available to the general public such as a computer monitor or television. In the illustrated example, the screen 102 comprises a graphical user interface (GUI) that allows the user of the interface to interact with at least a portion of the system 100 for any suitable purpose. Generally, the screen 102 provides the user of system 100 with an efficient and user-friendly presentation of data provided by the system 100. The screen 102 may include customizable frames or views having interactive fields, pull-down lists, and buttons operated by the user.

The bezel 104 comprises any suitable material for covering the edges of the screen 102 or for otherwise securing the screen 102 within the system 100 or within a portion of the system 100. For example, the bezel 104 may be a plastic component operable to cover at least a portion of the screen 102 to secure the screen 102 within a display housing. The bezel 104 may cover the entire perimeter of the screen 102 or a portion of the perimeter of the screen 102. In some examples, the bezel 104 is an ornamental covering affixed to the perimeter of the screen 102. Alternatively or in addition, the bezel 104 may be operable to retain the screen 102 in a particular position relative to the frame of the system 100. The bezel 104 may be affixed to the display with an adhesive such as an epoxy, glue, or others. Alternatively or in addition, the bezel 104 may be fixed to another portion of the system 100 using fasteners such as screws, nails, rivets, or others. For example, the bezel 104 may include one or more slots for receiving screws used to fasten the bezel 104 to another portion of the system 100. In the illustrated example, the bezel 104 includes the panel 106 for covering at least a portion of the embedded element 108.

The panel 106 can include any device operable to selectively switch between at least a substantially transparent state and at least a substantially opaque state. For example, the panel 106 may switch between an optically transparent state and an opaque state. In this case, images transmitted through the panel 106 may be captured by an image sensor connected to the system 100 and located behind the panel 106. Alternatively or in addition, the embedded element 108 may be perceived by the user of the system 100 when the panel 106 is in an optically transparent state. The panel 106 may be based on any suitable material or component operable to selectively switch between at least a substantially transparent state and at least a substantially opaque state. For example, the panel 106 may include a liquid crystal filter (LCD), electrochromic material, thermochromic material, smart glass, a transparent screen with an angled reflective surface that reflects light from a light source adjacent to an edge of the screen, or other suitable material and/or device operable to switch between optical states.

In the case that that panel 106 comprises an LCD, the rate of switching between optical states may be based, at lest in part, on an applied voltage. For example, an applied voltage of about 3 V may provide a slow fade between states over about 1 second (sec.). In contrast, an applied voltage equal to 110 V may switch the panel 106 between states at a rate that is perceived by the viewer as instantaneous. The LCD screen can be a conventional LCD display screen or can be an LCD panel with limited functionality. For example, the LCD panel may include a single pixel that results in the entire panel having substantially the same appearance. Alternatively, the LCD panel may have a large number of pixels that enable the panel to present a textured appearance through the use of some color variation between pixels. In some implementations, the LCD panel may have a limited range of color capabilities.

In some implementations, the panel 106 in the substantially opaque state is the same color as the bezel 104 or spectrally proximate to the color of the bezel 104 such that the user of the system 100 perceives the panel 106 as the same color as the bezel 104. In some implementations, it may be possible to distinguish between the panel 106 and the bezel 104 upon closer inspection, but the appearance may be sufficiently similar that, at least upon first glance, the distinction is not readily apparent. As a result, in switching between a substantially transparent state and a substantially opaque state, the panel 106 can appear to fade away or transform into a solid portion of the bezel 104, similar to the adjacent bezel surfaces.

The state of the panel 106 may be switched in response to any appropriate event. For example, the panel 106 may be switched in response to one or more of the following: a request from the user, a selection from the user via the screen 102, a request automatically generated by the system 100, an initiation of an application executed by the system 100, or other suitable events that are based, at least in part, on the actions of the user and/or processing by the system 100. In some implementations, the state of the panel 106 is switch by applying a voltage. For example, the default state of the panel 106, i.e., when substantially not voltage is applied to the panel 106, may be the transparent state. Ideally, however, the default would be the opaque state, which would allow the panel 106 to be in the opaque state when the device is completely powered down and/or is unplugged. In some implementations, both states may require some voltage applied to the panel 106 to have the appropriate appearance/optical characteristics. In some implementations, the panel 106 selectively switches between states in which the embedded element 108 is perceivable and not generally perceivable to the user of the system 100.

The embedded element 108 is any article that can at least be partially position behind the panel 106. In some implementations, the embedded element 108 is a symbol (e.g., logo), design, text, or other static image that may be presented to the user of the system 100 when the panel 106 is in a transparent state. Alternatively or in addition, the embedded element 108 may be a dynamic image that may be presented to the user of the system 100 when the panel 106 is in a transparent state. In other implementations, the embedded element 108 includes a device for capturing or otherwise receiving information transmitted through the panel 106. For example, the embedded element 108 may comprise a camera such that the lens of the camera is positioned behind the panel 106. In this case, the panel 106 may switch between states that substantially enable and substantially prevent the camera 108 from capturing images. In some examples, the camera 108 is a CMOS or CCD detector. In addition, the panel 106 may hide or otherwise cover the camera 108 when it is not in use. As a result, the user may not be aware that the camera 108 is included in the system 100, or may not be distracted or bothered by the presence of the camera 108, when the panel 106 is in the opaque state. Furthermore, the ability to fade between a substantially transparent and a substantially opaque state provides an added aesthetic feature.

In one aspect of operation, the panel 106 switches from a substantially opaque state to a substantially transparent state. As mentioned above, the switching may occur in response to an event such as a request automatically generated by the system 100. For example, the panel 106 may switch in response to the user selecting an application that utilizes the camera 108. In the substantially transparent state, the user may be able to perceive the embedded element 108 and/or the embedded element 108 may be able to capture or otherwise receive information transmitted through the panel 106. In the camera example, the camera 108 may be able to capture visible light transmitted through the panel 106 such that the system 100 may be able to generate an image based, at least in part, on the captured light. In the event that the panel 106 includes a non-optical grade transparent cover, the system 100 may perform additional processing to enhance the captured image. In addition, optical characteristics may be mapped out and image capturing may be calibrated based on these measurements prior to providing the system 100 to the user (e.g., during manufacturing). In addition, parameters such as glass thickness, acceptable actuating voltage, optical quality of glass, and color of opacity may be coordinated or matched to provide acceptable performance of the panel 106. In response to one or more predetermined events, the panel 106 switches to a substantially opaque state. In this state, the panel 106 may cover, hide, or other decrease the visibility of the embedded element 108. In the camera example, the panel 106 may prevent the camera 108 from detecting sufficient light and, thus, prevent the system 100 from generating an image. As mentioned above, the panel 106 in the opaque state may be the same color or spectrally proximate to the color of the bezel 104.

In some cases, techniques for switching between optical states can be implemented on devices other than the type of device depicted in FIG. 1. For example, the panel 106 may be included in a display device separate and distinct from a computer or other processing device, in a camera peripheral designed to connect to a computer through a universal serial bus (USB) or otherwise, or in any other type of device. In such an implementation, the panel 106 can be configured and arranged to fade between a substantially transparent state and a color and appearance of an adjacent portion of a housing for the device.

Figure 2A:
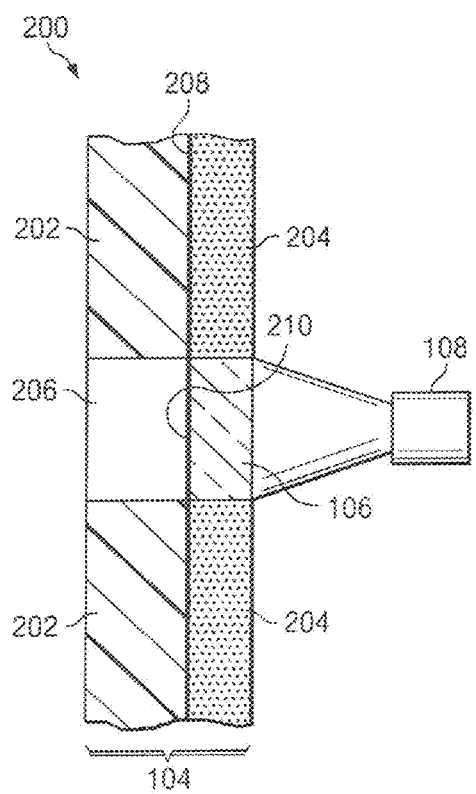
FIGS. 2A-C are illustrative diagrams of a privacy element of FIG. 1.
Figure 2B:
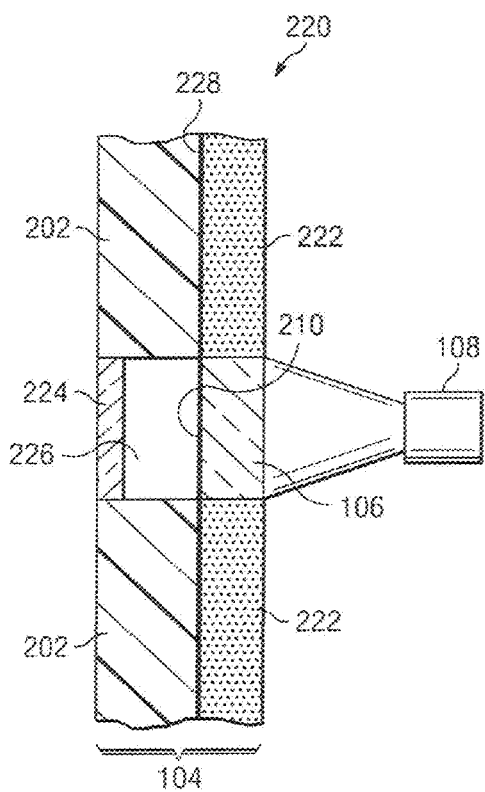
Figure 2C:
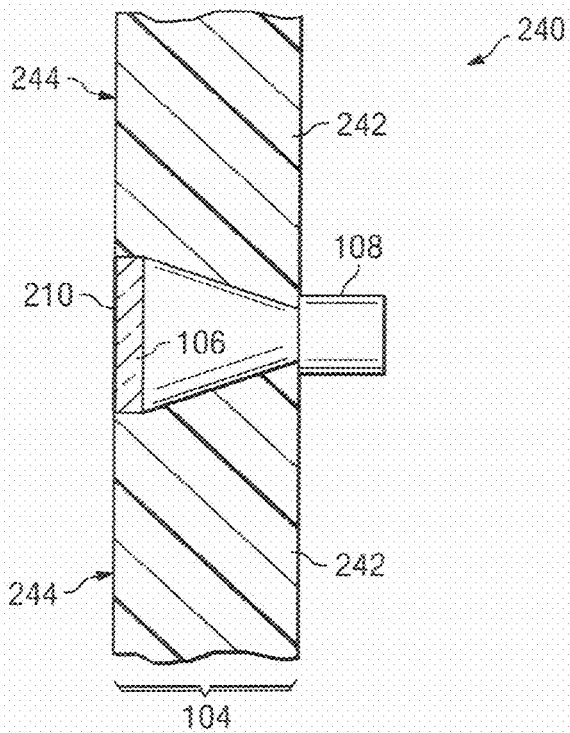

FIGS. 2A-C are illustrative diagrams of the panel 106 and the camera 108 of FIG. 1. It will be understood that illustrated configurations of viewable areas 106 and cameras 108, are for example purposes only. Accordingly, the panel 106 and camera 108 may be arranged in a different orientation as well as include different and/or additional elements. For example, instead of a camera, alternative or additional embedded elements 108 can be positioned behind the panel 106.

Referring to FIG. 2A, the camera system 200 illustrates an example configuration for combining the panel 106 and the camera 108. In the illustrated example, the bezel or housing 104 includes a transparent portion 202, an impregnated portion 204, and an optical portion 206. The bezel 104 is initially manufactured using a material that is sufficiently transparent such that an observer may perceive a color transmitted through the transparent material. For example, this material may comprise a plastic (e.g., clear plastic), epoxy, or other material that transmits a least a portion of visible light. The transparent portion 202 is constructed of this material. The bezel 104 is then injected or otherwise impregnated with a material that is substantially opaque, forming the impregnated portion 204. The bezel 104 may be injected or otherwise impregnated with any suitable material such as a plastic (e.g., white plastic), paint, epoxy, or other material. The boundary between the impregnated portion 204 and the transparent portion 202 forms an impregnated boundary 208. Thus, the bezel 104 has an appearance to users or other observers of having the color of the impregnated portion 204, which is visible through the transparent portion 202.

The optical portion 206 is any suitable material that sufficiently transmits visible light such that the camera 108 may capture at least a portion of the light and the system 100 may generate an image based, at least in part, on the captured light. For example, the optical portion 206 may comprise glass, plastic, or other sufficiently transparent material. In a typical implementation, the transparent portion 202 is not capable of transmitting light without distortion because it is made with a non-optical grade plastic or other material. The optical portion 206, on the other hand, can be made with an optical grade plastic, glass, or other material to allow light to pass with a relatively low level of distortion. As a result, the camera 108 can clearly and sharply capture images through the optical portion 206, and/or the camera 108 or other embedded elements can be clearly viewed through the optical portion 206 by a user.

As discussed above, the panel 106 selectively switches between a substantially transparent state and a substantially opaque state. In the illustrated example, the panel 106 is inserted or formed in the bezel 104 such that the boundary 210 of the panel 106 (i.e., between the panel 106 and the optical portion 206) substantially aligns with the embedded boundary 208. Indeed, the area boundary 210 and the embedded boundary 208 are substantially coplanar. As a result, a user of the system 100 may perceive that the panel 106 and the embedded portion 204 as substantially flush. In this case, the panel 106 and the impregnated portion 204 have the same depth from the surface of the bezel 104, preventing users from being able to use depth perception to distinguish between the viewing area 106 and the impregnated portion 204.

Referring to FIG. 2B, the camera system 220 illustrates an example configuration for combining the panel 106 and the camera 108. In the illustrated example, the bezel 104 includes a transparent portion 202, a painted portion 222, a window 224, and a cavity 226. The bezel 104 is initially manufactured using a material that is sufficiently transparent such that an observer may perceive a color transmitted through the transparent material. For example, this material may comprise a plastic, epoxy, or other material that transmits a least a portion of visible light. The transparent portion 202 comprises this material. The transparent portion 202 is then painted or otherwise coated with a material that is sufficiently opaque and, thus, forming the painted portion 204 on one side of the transparent portion 202 (i.e., on the side opposite an exterior surface of the bezel 104). The coating material may be any suitable material such as paint, plastic, epoxy, or other material. The boundary of the transparent portion 202 that abuts the painted portion 222 forms an outer boundary 228. The window 224 is any suitable material that sufficiently transmits visible light such that the camera 108 may capture at least a portion of the light and the system 100 may generate an image based, at least in part, on the captured light. For example, the window 224 may comprise glass, plastic, or other sufficiently transparent material. The cavity 226 is formed by the bezel 104, the window 224, and the panel 106.

As discussed above, the panel 106 selectively switches between a substantially transparent state and a substantially opaque state. In the illustrated example, the panel 106 is affixed to the bezel 104 such that the boundary 210 of the panel 106 substantially aligns with the outer boundary 228. Indeed, the area boundary 210 and the outer boundary 228 are substantially coplanar. As a result, a user of the system 100 may perceive that the panel 106 and the painted portion 222 are substantially flush. In this case, the panel 106 and the painted portion 222 have the same depth from the surface of the bezel 104, preventing users from being able to use depth perception to distinguish between the viewing area 106 and the painted portion 222.

Referring to FIG. 2C, the camera system 240 illustrates an example configuration for combining the panel 106 and the camera 108. In the illustrated example, the bezel 104 includes an opaque portion 242 and the panel 106. The bezel 104 is initially manufactured using a material that is sufficiently opaque. For example, this material may comprise a plastic, epoxy, or other material that does not substantially transmit visible light. In the case that the opaque portion 242 is sufficiently opaque, the boundary of the opaque portion 242 is perceived to be an outer boundary 244. As discussed above, the panel 106 includes the area boundary 210. In the illustrated example, the panel 106 is inserted, formed, or otherwise included in the bezel 104 such that the area boundary 210 substantially aligns with the outer boundary 244. Indeed, the area boundary 210 and the outer boundary 228 are substantially coplanar. As a result, a user of the system 100 may perceive that the panel 106 and the opaque portion 242 are substantially flush. In this case, the panel 106 and the opaque portion 242 have the same depth from the surface of the bezel 104, preventing users from being able to use depth perception to distinguish between the viewing area 106 and the opaque portion 242.

Figure 3:
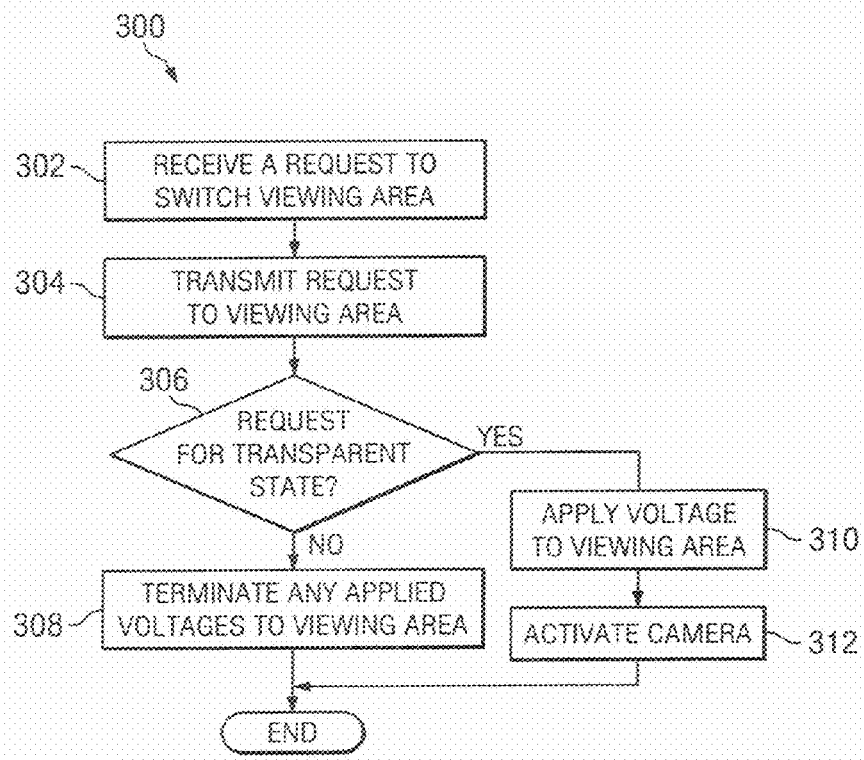
FIG. 3 is a flow diagram for controlling the privacy element of FIG. 1.

FIG. 3 is a flowchart illustrating example method 300 for optically switching the panel 106 of FIG. 1. Generally, method 300 describes one example technique for the system 100 to switch the panel 106. The following descriptions will focus on the operation of the system 100 in performing this method. But system 100 can use any appropriate combination and arrangement of logical elements implementing some or all of the described functionality.

Method 300 begins at step 302 where a request to switch the panel 106 is received. As discussed above, the request may be generated in response to a suitable event such as a request from the user or a request automatically generated by the system 100. Next, at step 304, the system 100 transmits a command to the panel 106 to selectively switch the panel 106 in accordance with the request. If the request is for the opaque state at decisional step 306, then the panel 106 terminates any voltages applied to switch to the default state at step 308. If the request is for the transparent state at decisional step 306, then the panel 106 applies the appropriate voltage to switch to the active state at step 310. In connection with activating the active state of the panel 106, the camera 108 is activated, at step 312, to capture light such that the system 100 may generate images based, at least in part, on the captured light.

The invention and all of the functional operations described in this specification can be implemented in digital electronic circuitry, or in computer software, firmware, or hardware, including the structural means disclosed in this specification and structural equivalents thereof, or in combinations of them. The invention can be implemented as one or more computer program products, i.e., one or more computer programs tangibly embodied in an information carrier, e.g., in a machine readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the invention, can be performed by one or more programmable processors executing one or more computer programs to perform functions of the invention by operating on input data and generating output. The processes and logic flows can also be performed by, and apparatus of the invention can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, the processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Although certain embodiments and generally associated methods have been described, alterations and permutations of these embodiments and methods will be apparent to those skilled in the art. Accordingly, the above description of example embodiments does not define or constrain the invention. Other changes, substitutions, and alterations are also possible without departing from the scope of the following claims.

What is claimed is:

1. An apparatus, comprising:
a housing adjacent at least a portion of a display of a device, wherein the housing includes a transparent portion and an opaque portion adjacent the transparent portion and a surface of the opaque portion defining boundary perceivable through the transparent portion;
a camera integrated into the housing and oriented to capture images proximate the device display; and
a panel positioned in front of at least a portion of the camera and operable to selectively switch between at least a substantially transparent state and at least a substantially opaque state, a surface of the panel in the substantially opaque state is substantially coplanar with at least a portion of the perceivable boundary, the substantially transparent state enables the camera to capture images of a user when viewing the device display, the substantially opaque state substantially prevents the camera from detecting images of a user of the device when viewing the device display.

2. The apparatus of claim 1, wherein the housing comprises a housing for at least one of a computer or display.

3. The apparatus of claim 1, wherein the panel in the substantially opaque state has a substantially similar appearance as a portion of the housing.

4. The apparatus of claim 1, wherein the panel in the substantially opaque state and the housing are substantially the same color.

5. The apparatus of claim 1, further comprising:
a screen; and
wherein the housing comprises a bezel for the screen and the panel is integrated within the bezel.

6. The apparatus of claim 1, wherein the transparent portion comprises optical grade plastic.

7. The apparatus of claim 1, wherein the panel in the substantially opaque state and the perceivable boundary are substantially the same color.

8. The apparatus of claim 1, wherein the panel comprises a liquid crystal display (LCD).

9. The apparatus of claim 1, wherein the housing and the panel are relatively disposed to provide a substantially consistent appearance when the panel is in the substantially opaque state.

10. The apparatus of claim 9, wherein the substantially consistent appearance is based on a similar depth from a surface of the housing.

11. The apparatus of claim 1, wherein the panel in the opaque state prevents the camera from capturing images.

12. The apparatus of claim 1, wherein the panel comprises a non-optical transparent cover, the apparatus further comprising a processor for processing images to remove distortion caused by the non-optical transparent cover.

13. A method, comprising:
constructing a device having a bezel operable to secure a screen within the device, the device including a camera oriented to capture images proximate the device screen, wherein the bezel includes a transparent portion and an opaque portion adjacent the transparent portion and a surface of the opaque portion defining boundary perceivable through the transparent portion;
forming a window in the bezel; and
integrating a panel in the window, the panel positioned in front of at least a portion of the camera and operable to selectively switch between at least a substantially transparent state and at least a substantially opaque state, a surface of the panel in the substantially opaque state is substantially coplanar with at least a portion of the perceivable boundary, the substantially transparent state enables the camera to capture images of a user when viewing the device display, the substantially opaque state substantially prevents the camera from detecting images of a user of the device when viewing the device display.

14. The method of claim 13, further comprising connecting the panel to a switch for controlling the switching between the states.

15. The method of claim 13, wherein the panel comprises an LCD.

16. The method of claim 13, wherein the camera comprises a charge-coupled device (CCD) or a complementary metal-oxide semiconductor (CMOS) device.

17. The method of claim 13, wherein the bezel and the panel are substantially the same color.

18. The method of claim 13, wherein the panel in the opaque state substantially prevents a user of the device from viewing the camera.

19. An article comprising a machine-readable, non-transitory medium storing instructions for causing data processing apparatus to perform the steps of:
receiving a request to activate an opaque state of a filter of a device, the filter located within a housing adjacent at least a portion of a display and being operable to transform between a transparent state in which the filter is at least substantially transparent and an opaque state in which the filter is at least substantially opaque, the housing includes a transparent portion and an opaque portion adjacent the transparent portion and a surface of the opaque portion defining boundary perceivable through the transparent portion, the transparent state enables an image sensor to detect images of a user when viewing the device display through the filter, the opaque state at least substantially prevents the image sensor from detecting images of a user of the device when viewing the device display; and
sending a control signal to the filter to switch to the opaque state, wherein a surface of the filter in the substantially opaque state is substantially coplanar with at least a portion of the perceivable boundary.

20. The article of claim 19 wherein the filter comprises a liquid crystal display panel and a liquid crystal display driver for controlling the liquid crystal display panel in accordance with the control signal.

21. The article of claim 20 wherein the liquid crystal display driver is operable to cause the liquid crystal display panel to switch between the opaque state and the transparent state in at least one of a time period that provides a substantially imperceptible transformation between the opaque state and the transparent state or a time period that provides a perceptible fade between the opaque state and the transparent state.

22. A system comprising:

a housing for a display, wherein the housing includes a transparent portion and an opaque portion adjacent the transparent portion and a surface of the opaque portion defining boundary perceivable through the transparent portion; and means for selectively transforming a surface between at least a substantially transparent state and at least a substantially opaque state, a surface of the means for selectively transforming a surface in the substantially opaque state is substantially coplanar with at least a portion of the perceivable boundary, the substantially transparent state for enabling light from a viewable object in front of the display on a first side of the surface to pass through the surface to a second side of the surface and the substantially opaque state for preventing light from the viewable object in front of the display from passing through the surface to the second side of the surface, wherein the surface in the substantially opaque state has a substantially similar appearance as at least a portion of the housing adjacent to the surface.

23. The system of claim 22, wherein the viewable object is situated within the housing.

24. The system of claim 22, further comprising a means, disposed on the second side of the surface, for detecting an image of the viewable object.

25. The system of claim 22, further comprising an optical grade cover for the surface, an exterior surface of the optical grade cover flush with an exterior surface of the housing.

26. The system of claim 22, further comprising:

a substantially transparent cover for the surface; and means for removing distortion in a detected image introduced by the cover.

27. The system of claim 22, further comprising means for at least substantially reducing a difference in a perceived depth between the surface in the substantially opaque state and an opaque facade of the housing.

28. The system of claim 22, wherein the substantially opaque state for the panel is associated with a dormant state of the panel.

* * * * *